United States Patent [19]
Basset et al.

[11] Patent Number: 5,846,661
[45] Date of Patent: Dec. 8, 1998

[54] FILM FOR THE TREATMENT OF SOILS BY FUMIGATION

[75] Inventors: Dominique Basset, Bernay; Marie-Pierre Corbic-Bellinger, Houilles; Bruno Echalier, Paris, all of France

[73] Assignee: Elf Atochem S.A., Puteaux, France

[21] Appl. No.: 726,918

[22] Filed: Oct. 7, 1996

[30] Foreign Application Priority Data

Oct. 5, 1995 [FR] France .................................... 95 11698

[51] Int. Cl.⁶ .............................. B32B 27/08; A01G 1/00
[52] U.S. Cl. .................................... 428/474.4; 428/319.9; 428/336; 428/422; 428/463; 428/475.5; 428/476.1; 428/520; 428/516; 47/6; 47/9; 47/58
[58] Field of Search .............................. 428/319.9, 336, 428/422, 474.4, 463, 475.5, 476.1, 520, 516; 47/6, 9, 58

[56] References Cited

U.S. PATENT DOCUMENTS

| | | | |
|---|---|---|---|
| 4,225,476 | 9/1980 | Hammer et al. | 524/270 |
| 4,612,221 | 9/1986 | Biel | 428/35 |
| 4,819,374 | 4/1989 | Gemgnani | 47/58 |
| 4,820,589 | 4/1989 | Dobreski | 428/422 |
| 4,911,979 | 3/1990 | Nishimoto et al. | 428/332 |
| 4,990,562 | 2/1991 | Chou et al. | 525/58 |
| 5,064,716 | 11/1991 | Chou et al. | 428/336 |
| 5,070,145 | 12/1991 | Guerdoux | 525/179 |
| 5,126,401 | 6/1992 | Chou | 525/58 |
| 5,177,138 | 1/1993 | Moriyama et al. | 524/437 |
| 5,286,575 | 2/1994 | Chou | 428/474.4 |
| 5,342,886 | 8/1994 | Glotin et al. | 525/66 |
| 5,449,552 | 9/1995 | Bochow | 428/323 |

FOREIGN PATENT DOCUMENTS

| | | |
|---|---|---|
| 35650/93 | 10/1993 | Australia . |
| A-35650-93 | 10/1993 | Australia . |
| 595706 | 5/1994 | European Pat. Off. . |
| 58-211450 | 12/1983 | Japan . |

OTHER PUBLICATIONS

Abstract of AU 11,107/92, Aug. 27, 1992, H. Shoshani, Multilayer gas impervious plastic film for crop protection.

*Primary Examiner*—Leszek Kiliman
*Attorney, Agent, or Firm*—Pennie & Edmonds LLP

[57] ABSTRACT

The present invention relates to a film (A) consisting of a mixture comprising at least one polyamide and at least one polyolefin, the said film being placed on agricultural land into which a fumigant is injected. According to a first variant, the invention also relates to a film comprising the above layer (A) and a layer (B) consisting essentially of a polyolefin. According to a second variant, the invention also relates to a film comprising the above layer (A) placed between two layers (B). A coextrusion binder may optionally be placed between the layers (A) and (B) in the two variants. The invention also relates to a process for the treatment of soils by fumigation.

27 Claims, No Drawings

5,846,661

FILM FOR THE TREATMENT OF SOILS BY FUMIGATION

TECHNICAL FIELD

The present invention relates to a film for the a treatment of soils by fumigation. The invention also relates to a process for the treatment of soils by fumigation.

BACKGROUND OF THE INVENTION

The treatment of soils by fumigation consists of injecting gases into the soil, before seeding or planting, in order to disinfect the ground, then the soil is covered with a film of plastic in order to keep these gases in the soil and thus allow them to act.

Methyl bromide, 1,3-dichloropropene, methyl chloride, 3,5-dimethyltetrahydro-1,3,5-thiadiazin-2-thione, sodium tetrathiocarbonate or metham-sodium ($CH_3NHCS$-SNa) may be used for example.

U.S. Pat. No. 4,819,374 (and EP 30,793) describes films consisting of a polyamide-6/ethylene, 1-octene copolymer bilayer, for fumigation with methyl bromide or with chloropicrine. This film is described as being more leak tight to fumigation gases than a low-density polyethylene film. The amount of gas to be used may thus be reduced.

AU 11,107/92 also describes polyethylene/barrier layer bilayers in this application. The barrier layer may be made of polyamide, polyethylene terephthalate, EVOH (ethylene-vinyl alcohol copolymer) or polyurethane. A coextrusion binder is preferably placed between the two layers.

SUMMARY OF THE INVENTION

The present invention is a film (A) consisting of a mixture comprising at least one polyamide and at least one polyolefin which is placed on agricultural land into which a fumigant is injected.

DETAILED DESCRIPTION OF THE INVENTION

The Applicant has discovered that films based on a mixture of polyamide (PA) and polyolefin form a much better barrier to fumigants than a polyamide film or a polyolefin film. The present invention is thus a film (A) consisting of a mixture comprising at least one polyamide and at least one polyolefin which is placed on agricultural land into which a fumigant is injected. According to a first variant, the invention also relates to a film comprising the above layer (A) and a layer (B) consisting essentially of a polyolefin.

According to a second variant, the invention also relates to a film comprising the above layer (A) placed between two layers (B).

A coextrusion binder may optionally be placed between the layers (A) and (B) in the two variants.

In addition to the barrier properties, an advantage of the films of the invention is that they may readily be extruded in large widths on machines used for polyethylene (PE) whereas polyamide films require a specific extrusion screw profile.

Another advantage of the films of the invention is that the adhesion between the layer (A) and the layer (B), without using binder between these layers, is from 10 to 30 g/15 mm whereas in the case of a polyamide film, the adhesion with the layer (B) is zero or almost zero. This adhesion is measured by peeling at 180° C. at a rate of 200 mm/min over a width of 15 mm.

Another advantage is the mechanical strength; the film placed on the ground is not pierced when it is walked on, whereas a polyamide film of the same thickness becomes pierced.

Another advantage by comparison with a polyethylene film is that the amount of fumigant can be reduced while at the same time having the same biological efficacy.

As regarding the film (A) consisting of a mixture comprising at least one polyamide and at least one polyolefin, the term polyamide is understood to refer to the condensation products:

of one or more amino acids, such as aminocaproic, 7-aminoheptanoic, 11-aminoundecanoic and 12-aminododecanoic acids of one or more lactams such as caprolactam, oenantholactam and lauryllactam;

of one or more salts or mixtures of diamines such as hexamethylenediamine, dodecamethylenediamine, metaxylylenediamine, bis-p-aminocyclohexylmethane and trimethylhexamethylenediamine with diacids such as isophthalic, terephthalic, adipic, azelaic, suberic, sebacic and dodecanedicarboxylic acids;

or mixtures of any of these monomers, which leads to copolyamides.

Polyamide mixtures may be used. Nylon-6 is advantageously used.

The term polyolefins is understood to refer to polymers comprising olefin units such as, for example, ethylene, propylene, 1-butene, etc., units.

Mention may be made, by way of example, of:

polyethylene, polypropylene, copolymers of ethylene with alpha-olefins, it being possible for these products to be grafted with unsaturated carboxylic acid anhydrides such as maleic anhydride or unsaturated epoxides such as glycidyl methacrylate, copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their hemiesters and their anhydrides, and (iv) unsaturated epoxides, it being possible for these ethylene copolymers to be grafted with unsaturated dicarboxylic acid anhydrides or unsaturated epoxides, block copolymers such as styrene/ethylene-butadiene/styrene (SEBS) which may be maleic-treated.

Mixtures of two or more of these polyolefins may be used. The following are advantageously used:

polypropylene, polyethylene, copolymers of ethylene and an alpha-olefin, copolymers of ethylene/alkyl (meth) acrylate, copolymers of ethylene/alkyl (meth)acrylate/maleic anhydride; the maleic anhydride being grafted or copolymerized, copolymers of ethylene/alkyl (meth)acrylate/glycidyl methacrylate; the glycidyl methacrylate being grafted or copolymerized.

If the polyolefins have few or no functions which can facilitate the compatibilization, it is recommended to add a compatibilizing agent.

The compatibilizing agent is a product which is known per se to compatibilize polyamides and polyolefins.

Mention may be made, for example, of:

polyethylene, polypropylene, ethylene-propylene copolymers, ethylene-butene copolymers; all of these products being grafted with maleic anhydride or glycidyl methacrylate, ethylene/alkyl (meth)acrylate/maleic anhydride copolymers; the maleic anhydride being grafted or copolymerized, ethylene/vinyl acetate/maleic anhydride copolymers; the maleic anhydride being grafted or copolymerized, the above two copolymers in which the maleic anhydride is replaced by glycidyl methacrylate, ethylene/(meth)acrylic acid copolymers and optionally their salts, polyethylene, propylene or ethylene-propylene copolymers, these polymers being grafted with a product having a site which is reactive with amines; these grafted copolymers then being condensed with polyamides or polyamide oligomers having a single amine terminal.

These products are described in U.S. Pat. No. 4,225,476 (and French Patent 2,291,225) and U.S. Pat. No. 5,342,886 (and EP 342,066), the contents of which are incorporated into the present application.

The amount of compatibilizing agent is the amount which is sufficient for the polyamide and polyolefin mixture to be converted into a film having the barrier properties and the mechanical properties mentioned above. This amount depends on the reactive groups contained in the polyolefin and in the compatibilizing agent itself. A person skilled in the art can readily determine this amount. By way of example, this amount may be from 5 to 20 parts by weight per 100 parts by weight of polyolefin/polyamide mixture.

Preferably, the mixture of polyamide and polyolefin and optionally of compatibilizing agent is in the form of a polyamide matrix containing polyolefin nodules or nodules of a mixture of polyamide and polyolefin. These mixtures of polyamide, polyolefin and optionally of compatibilizing agent are manufactured according to the usual techniques for mixing in the molten state (twin-screw, Buss, single-screw).

The film (A) is then produced according to the usual techniques.

Advantageously, the mixture comprises a nylon-6 or nylon-6,6 matrix in which are dispersed either nodules of a mixture of polyethylene and a copolymer of ethylene, alkyl (meth)acrylate and maleic anhydride or glycidyl methacrylate, or nodules of polypropylene.

In the case of polypropylene, a compatibilizing agent is added which is advantageously an ethylene/propylene copolymer containing a majority, in numerical terms, of propylene units, grafted with maleic anhydride and then condensed with caprolactam monoamino oligomers. Such products are described in U.S. Pat. No. 5,070,145 and AU 35,650/93 (and EP 564,338).

These mixtures of polyamide and polyolefin may be plasticized and may optionally contain fillers such as carbon black, etc.

Preferably, the amount of polyamide is between 50 and 75 parts by weight per 100 parts by weight of the polyamide/polyolefin mixture.

By way of example, the following mixtures may be used (in % by weight):

1) 55 to 70% nylon-6, 5 to 15% of an ethylene-propylene copolymer with a majority content of polypropylene grafted with maleic anhydride and then condensed with caprolactam monoamino oligomers, the complement to 100% (i.e., the balance of the units) being polypropylene.

2) 55 to 70% nylon-6, 5 to 15% of at least one copolymer of ethylene with (i) an alkyl (meth)acrylate or a vinyl ester of unsaturated carboxylic acid and (ii) an unsaturated carboxylic acid anhydride or unsaturated epoxide grafted or copolymerized, the complement (i.e., the balance of the units) being polyethylene.

3) 55 to 70% nylon-6, 5 to 15% polyethylene or copolymers of ethylene and an alpha-olefin grafted with maleic anhydride or glycidyl methacrylate, the complement (i.e., the balance of the units) being polyethylene.

The film is placed over the soil either before injecting fumigant or immediately after this injection. If the film is installed before the injection, it is recommended not to damage the film with the injectors or to provide a leak-proofing system.

The thickness of the film may be between 20 and 150 $\mu$m. According to a first variant, a layer (B) made of polyolefin may be combined with the above film, that is to say that the film of the invention is in the form of a bilayer. The polyolefin of this second layer (B) may be chosen from the polyolefins of the polyamide-polyolefin mixture of film (A).

This second layer is essentially useful for the mechanical strength of the system, and polyethylene is advantageously used.

Advantageously, the film of this first variant has a polyamide/polyolefin barrier layer (A) thickness of from 10 to 50 $\mu$m and a polyethylene layer (B) thickness of from 10 to 50 $\mu$m.

According to a second variant of the invention, the layer (A) is placed between two layers (B).

It is optionally possible in these two variants to place a coextrusion binder between the layers (A) and (B).

By way of example, binders may be made of:

polyethylene, polypropylene, copolymers of ethylene and at least one alpha-olefin, mixtures of these polymers; all of these polymers being grafted with unsaturated carboxylic acid anhydrides such as, for example, maleic anhydride. Mixtures of these grafted polymers and of these ungrafted polymers may also be used.

copolymers of ethylene with at least one product chosen from (i) unsaturated carboxylic acids, their salts and their esters, (ii) vinyl esters of saturated carboxylic acids, (iii) unsaturated dicarboxylic acids, their salts, their eaters, their hemiesters and their anhydrides, and (iv) unsaturated epoxides; it being possible for these copolymers to be grafted with unsaturated dicarboxylic acid anhydrides such as maleic anhydride or unsaturated epoxides such as glycidyl methacrylate. These films may be manufactured by the usual techniques such as extrusion and coextrusion of sheaths, and extrusion and coextrusion of cast films.

According to another variant, instead of using a binder, it is also possible to incorporate a grafted polyolefin into the polyolefin of the layer (B) in order to increase the adhesion between the layers (A) and (B). It is thus possible to obtain adhesions greater than 300 g/15 mm. The amount of grafted polyolefin may represent 10 to 20% of the weight of layer (B).

EXAMPLES

The following non-limiting examples are merely illustrative of the preferred embodiments of the present invention, and are not to be construed as limiting the invention, the scope of which is defined by the appended claims.

The melt index (MI) was measured with a weight of 2.16 kg according to ASTM standard D 1238-70 and expressed in g/10 min.

In the examples, the following products were used (% expressed on a weight basis, parts expressed on a weight basis):

A1 denotes a mixture of:

60% nylon-6 of MI 2-3 (at 235° C.),

30% polypropylene of MI 1.5–2 (at 235° C.), and

10% ethylene/propylene trunk copolymer containing 12% ethylene, grafted with maleic anhydride (1% anhydride relative to the trunk) and then condensed with a caprolactam monoamino oligomer with a degree of polymerization of 22, the amount of these oligomers being 25% relative to the trunk.

A2 denotes a mixture of:

65% nylon-6 of MI 15–17 (at 235° C.),

27% LDPE, a polyethylene-containing polymer, of MI 1 (at 190° C.), and

8% of an ethylene/butyl acrylate/maleic anhydride copolymer containing 5.5% acrylate and 3.6% anhydride, of MI 5 (at 235° C.).

C2 denotes a nylon-6 of MI 15–17 (at 235° C.).

C3 denotes PEBD, a polyethylene-containing polymer, of MI 1 (at 190° C.).

Example 1

A film is placed in a cell in order to obtain two compartments. One of the compartments is flushed with methyl bromide ($CH_3Br$) and the other with a stream of dry air. A differential manometer allows the flow rate to be controlled in order to avoid positive or negative pressure on the film. The flow of $CH_3Br$ which crosses the film was measured by gas chromatography, expressed by the coefficient of permeability, in $g/m^2 \cdot h$ or in $g \cdot 50 \mu m/m^2 \cdot h$, and the maximum concentration of $CH_3Br$, which passed through into the dry air, was also obtained. The results obtained at 20° C. and 60° C. are collated in Table 1.

TABLE 1

Permeability to methyl bromide

Temperature 20° C.

| Film | Thickness ($\mu m$) | Coeff. perm. ($g/m^2 \cdot h$) | Coeff. perm. ($g \cdot 50 \mu m/m^2 \cdot h$) | max. $CH_3Br$ ($g/m^3$) |
|---|---|---|---|---|
| A1 | 63 | 0.0035 | 0.0044 | 0.053 |
| A2 | 51.9 | 0.0018 | 0.0019 | 0.028 |
| C2 | 33 | 0.122 | 0.08 | 1.69 |
| C3 | 38 | 11.9 | 9 | 165.2 |

Temperature 60° C.

| Film | Thickness ($\mu m$) | Coeff. perm. ($g/m^2 \cdot h$) | Coeff. perm. ($g \cdot 50 \mu m/m^2 \cdot h$) | max. $CH_3Br$ ($g/m^3$) |
|---|---|---|---|---|
| A1 | 63 | 0.215 | 0.3 | 2.98 |
| A2 | 51.9 | 0.458 | 0.5 | 6.36 |
| C2 | 33 | 0.81 | 0.5 | 11.29 |
| C3 | 38 | 53.22 | 40.5 | 737.1 |

Example 2

Fumigation of soils

The test takes place in the Gironde, in the agricultural region of Les Graves. The plot is typical of this region: rocky-sandy structure, soil fairly rich in organic matter (3%) and highly filtering.

The soil is dry, very aerated and, three days before the application, has received a supply of moderately decomposed manure. The application is carried out with a machine equipped with coulter injectors spaced about 30 cm apart. The methyl bromide is supplemented with 2% chloropicrine.

The films tested and compared are:

film F1: 50 micron reference film, made of polyethylene C3 film F2: film according to the invention, consisting of a layer made of mixture A2 of PA and PE, with a thickness of 16 $\mu$m between two layers of PE C3 18 $\mu$m in thickness.

The methyl bromide concentrations are measured using copper probes (diameter 4–6) and a machine using the principle of thermoconductivity (Gow-mac).

The test is carried out according to the technique of application by cold-injection mulching over the entire plot. Thus, the methyl bromide is applied to a depth of 20 cm.

Three modes are studied:

film F1 at a normal dose: 80 $g/m^2$ (F1-80)

film F2 at a normal dose: 80 $g/m^2$ (F2-80)

film F2 at a half-dose: 45 $g/m^2$ (F2-45) The three plots each have an area of about 400 $m^2$.

The amount of methyl bromide supplied to the soil is controlled by a flow meter mounted on the machine. After the gas has been injected, the soil is then covered with the film. The methyl bromide concentration is then measured as a function of the time and the depth.

On each plot, the methyl bromide concentrations are monitored in the following way:

four measuring "poles" per mode, i.e. four repetitions, denoted: A, B, C, D.

two probes per pole, one placed at a depth of 10 cm, the other at 25 cm.

This gives a total of 24 measuring points.

The frequency of the measurements is established arbitrarily. However, a maximum number of measurements is taken during the early hours of the fumigation so as to clearly frame the peak for the condensations.

The set of values then makes it possible to calculate, per measurement point, the concentration-time product (CT, expressed as $g \cdot h \cdot m^{-3}$), the only criterion of biological efficacy.

The test took place over a mild but fairly windy climatic period. During the disinfection, the temperature of the soil at a depth of 10 cm was very satisfactory, since it was equal to 19.8° C. During the fumigation, the average temperature of the soil was 22.3° C. The temperature under the plastic film oscillated between 9.5° C. and 53.8° C. with an average of 25.6° C.

The set of measurements taken throughout the fumigation period on the 24 measurement points is collated in Table 2.

TABLE 2

CH$_3$Br concentrations (g/m$^3$) recorded during fumigation (hour:min:sec; fumigation at T = 0)

| Plot description | F1 80 A | | F1 80 B | | F1 80 C | | F1 80 D | | F2 80 A | | F2 80 B | |
|---|---|---|---|---|---|---|---|---|---|---|---|---|
| Probe depth (cm) | 10 | 25 | 10 | 25 | 10 | 25 | 10 | 25 | 10 | 25 | 10 | 25 |
| Pre-fumigation | 0 | 0 | 0 | 0 | 0 | 0 | 0 | 0 | 0 | 0 | 0 | 0 |
| T + 00:15:00 | 264 | 288 | 204 | 210 | 192 | 162 | 189 | 180 | 264 | 258 | 264 | 246 |
| T + 01:00:00 | 156 | 162 | 120 | 126 | 123 | 126 | 114 | 132 | 180 | 174 | 213 | 186 |
| T + 01:20:00 | 108 | 117 | 96 | 102 | 108 | 108 | 84 | 102 | 138 | 144 | 192 | 168 |
| T + 03:15:00 | 76 | 80 | 84 | 84 | 92 | 98 | 68 | 88 | 100 | 124 | 144 | 148 |
| T + 03:45:00 | 62 | 62 | 68 | 78 | 66 | 92 | 62 | 84 | 68 | 100 | 110 | 128 |
| T + 07:50:00 | 54 | 52 | 58 | 64 | 50 | 74 | 55 | 78 | 64 | 76 | 80 | 94 |
| T + 22:40:00 | 23 | 23 | 26 | 26 | 30 | 31 | 34 | 41 | 53 | 51 | 46 | 48 |
| T + 24:30:00 | 22 | 20 | 25 | 26 | 24 | 31 | 33 | 40 | 50 | 52 | 44 | 46 |
| T + 27:10:00 | 21 | 19 | 23 | 25 | 23 | 27 | 31 | 38 | 44 | 50 | 42 | 46 |
| T + 52:20:00 | 12 | 12 | 12 | 13 | 11.8 | 14 | 18 | 20 | 26 | 29 | 23 | 29 |
| T + 79:10:00 | 3.7 | 3.7 | 3.7 | 3.7 | 2 | 4 | 4 | 3.7 | 6.2 | 8 | 7 | 8 |
| T + 94.10:00 | 1.5 | 1.7 | 1.7 | 1.8 | 0.3 | 1.8 | 1.9 | 2 | 4.2 | 4.2 | 5 | 5.5 |
| T + 119.10:00 | 2 | 2 | 2 | 2 | 0.5 | 2 | 2 | 2 | 4 | 4 | 4.5 | 5 |

| Plot description | F2 80 C | | F2 80 D | | F2 45 A | | F2 45 B | | F2 45 C | | F2 45 D | |
|---|---|---|---|---|---|---|---|---|---|---|---|---|
| Probe depth (cm) | 10 | 25 | 10 | 25 | 10 | 25 | 10 | 25 | 10 | 25 | 10 | 25 |
| Pre-fumigation | 0 | 0 | 0 | 0 | 0 | 0 | 0 | 0 | 0 | 0 | 0 | 0 |
| T + 00:15:00 | 280 | 264 | 248 | 240 | 150 | 222 | 288 | 272 | 168 | 280 | 132 | 272 |
| T + 01:00:00 | 240 | 222 | 198 | 192 | 90 | 102 | 132 | 129 | 93 | 126 | 84 | 126 |
| T + 01:20:00 | 192 | 198 | 174 | 174 | 84 | 84 | 96 | 102 | 93 | 102 | 75 | 99 |
| T + 03:15:00 | 152 | 162 | 128 | 144 | 66 | 72 | 68 | 76 | 68 | 80 | 68 | 74 |
| T + 03:45:00 | 130 | 140 | 88 | 134 | 64 | 68 | 62 | 68 | 68 | 72 | 52 | 68 |
| T + 07:50:00 | 96 | 100 | 82 | 104 | 44 | 56 | 48 | 54 | 56 | 56 | 40 | 50 |
| T + 22:40:00 | 58 | 58 | 64 | 64 | 22 | 22 | 28 | 28 | 37 | 37 | 40 | 40 |
| T + 24:30:00 | 56 | 56 | 63 | 63 | 23 | 24 | 30 | 28 | 39 | 37 | 35 | 40 |
| T + 27:10:00 | 53 | 57 | 60 | 61 | 25 | 26 | 32 | 31 | 38 | 36 | 34 | 38 |
| T + 52:20:00 | 30 | 32 | 32 | 40.5 | 11 | 16.5 | 19 | 20 | 21 | 23 | 21 | 24.5 |
| T + 79:10:00 | 9.7 | 10.2 | 9.7 | 10 | 3 | 4.3 | 3.7 | 4.2 | 6 | 7 | 5.5 | 8 |
| T + 94.10:00 | 6 | 6.5 | 8 | 7.5 | 3 | 3.7 | 4 | 4.2 | 6 | 6 | 6 | 6.2 |
| T + 119.10:00 | 6 | 6 | 6.5 | 6.5 | 2 | 2.5 | 4 | 4 | 6 | 6 | 5.5 | 6 |

The gas diffused very well into the deep layers. After 120 hours, the gas concentrations measured are very low. The concentration-time products are collated in Tables 3–5.

TABLE 3

CT obtained on plot covered by F1 at 80 g · m$^{-2}$
(Concentration × time in g · h · m$^{-3}$)

| Measurement point Depth | A | B | C | D | Average | Standard deviation |
|---|---|---|---|---|---|---|
| 10 cm | 2109 | 2177 | 2078 | 2454 | 2204.5 | 171.4 |
| 25 cm | 2097 | 2325 | 2580 | 2996 | 2500 | 334.45 |

TABLE 4

CT obtained on plot covered by F2 at 80 g · m$^{-2}$
Concentration × time in g · h · m$^{-3}$

| Measurement point Depth | A | B | C | D | Average | Standard deviation | % increase relative to F1-80 g · m$^{-2}$ |
|---|---|---|---|---|---|---|---|
| 10 cm | 3426 | 3678 | 4458 | 4387 | 3986.25 | 443.9 | 45 |
| 25 cm | 3831 | 4064 | 4642 | 4949 | 4371.5 | 445.35 | 43 |

TABLE 5

CT obtained on plot covered by F2 at 45 g · m$^{-2}$
(Concentration × time in g · h · m$^{-3}$)

| Measurement point Depth | A | B | C | D | Average | Standard deviation | % increase relative to F1-80 g · m$^{-2}$ |
|---|---|---|---|---|---|---|---|
| 10 cm | 1877 | 2453 | 2794 | 2523 | 2411.75 | 385.6 | 8.6 |
| 25 cm | 2258 | 2548 | 2950 | 2995 | 2687.75 | 349.9 | 7 |

For equal doses, the film F2 makes it possible to obtain markedly higher results than the reference PE at 80 g·m$^{-2}$ since the increase in CT values is 45% at 10 cm and 43% at 25 cm. At half-dose, the film F2 also exceeds the reference by several percent.

This test shows that it is entirely possible to reduce the methyl bromide doses significantly. Indeed, the same level of efficacy is achieved between the reference and the combination half-dose film F2, the CT values being in the region of 2500 g·h·m$^{-3}$.

Lastly, this experiment has revealed that the mechanical strength of film F2 was greater than that of the usual films.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A film (A) for use in covering agricultural land comprising a fumigant and having enhanced fumigant impermeability, wherein the film consists of a mixture comprising at least one polyamide and at least one polyolefin.

2. The film according to claim 1, comprising a second layer (B) consisting essentially of a polyolefin.

3. The film according to claim 1, comprising the layer (A) placed between two layers (B), wherein each layer of (B) consists essentially of a polyolefin.

4. The film according to claim 2, in which a coextrusion binder is placed between layer (A) and layer (B).

5. The film according to claim 3, in which a coextrusion binder is placed between layer (A) and layer (B).

6. The film according to claim 1, in which the amount of polyamide in the mixture of polyamide and polyolefin of the film (A) is between 50 and 75 parts by weight per 100 parts by weight of the mixture.

7. The film according to claim 2, in which the amount of polyamide in the mixture of polyamide and polyolefin of the film (A) is between 50 and 75 parts by weight per 100 parts by weight of the mixture.

8. The film according to claim 3, in which the amount of polyamide in the mixture of polyamide and polyolefin of the film (A) is between 50 and 75 parts by weight per 100 parts by weight of the mixture.

9. The film according to claim 4, in which the amount of polyamide in the mixture of polyamide and polyolefin of the film (A) is between 50 and 75 parts by weight per 100 parts by weight of the mixture.

10. The film according to claim 5, in which the amount of polyamide in the mixture of polyamide and polyolefin of the film (A) is between 50 and 75 parts by weight per 100 parts by weight of the mixture.

11. The film of claim 1, wherein the mixture further comprises a compatibilizing agent.

12. The film of claim 1, wherein the mixture comprises a matrix comprising the polyamide and a plurality of nodules comprising the polyolefin or a blend of the polyamide and the polyolefin.

13. The film of claim 1, wherein the polyamide is selected from the group consisting of nylon-6, nylon-6,6 and mixtures thereof.

14. The film of claim 1, wherein the polyolefin is selected from the group consisting of polyethylene, a terpolymer of ethylene/alkyl (meth)acrylate/maleic anhydride, a terpolymer of ethylene/alkyl (meth)acrylate/glycidyl methacrylate and mixtures thereof.

15. The film of claim 1, wherein the polyolefin comprises polypropylene.

16. The film of claim 15, wherein the polyolefin further comprises ethylene/propylene copolymer containing a majority, in numerical terms, of propylene units, grafted with maleic anhydride and then condensed with caprolactam monoamino oligomers.

17. The film of claim 2, wherein the second layer (B) comprises polyethylene.

18. The film of claim 3, wherein at least one layer (B) comprises polyethylene.

19. The film (A) of claim 1 having a thickness, wherein the thickness is from 10 to 50 µm.

20. The film of claim 2 having a layer (A) with a thickness (a) and a layer (B) with a thickness (b), wherein the thickness (a) is from 10 to 50 µm and the thickness (b) is from 10 to 50 µm.

21. The film of claim 1, with the proviso that the polyolefin does not comprise an ethylene/alkyl (meth)acrylate/unsaturated epoxide terpolymer.

22. A process for fumigating agricultural land treated with a fumigant comprising the steps of (1) forming a film according to claim 1 and (2) covering the agricultural land comprising the fumigant with the film.

23. The process of claim 22, wherein the fumigant comprises methyl bromide.

24. A process for fumigating agricultural land treated with a fumigant comprising the steps of (1) forming a film having enhanced fumigant impermeability from a mixture comprising at least one polyamide and at least one polyolefin and (2) covering the agricultural land comprising the fumigant with the film.

25. The process of claim 24, wherein the film has a coefficient of permeation to the fumigant and wherein the coefficient of permeation of the film is less than the coefficient of permeation of a film comprising a polymer component consisting essentially of at least one polyamide or at least one polyolefin.

26. The film of claim 1 having a coefficient of permeation to methyl bromide, wherein the coefficient of permeation at 20° C. is less than or equal to about 0.0044 g·50 µm/m²·h.

27. The film of claim 1 having a coefficient of permeation to methyl bromide, wherein the coefficient of permeation at 60° C. is less than or equal to about 0.5 g·50 µm/m² h.

* * * * *

UNITED STATES PATENT AND TRADEMARK OFFICE
CERTIFICATE OF CORRECTION

PATENT NO. : 5,846,661
DATED : December 8, 1998
INVENTOR(S) : Basset et al.

It is certified that error appears in the above-identified patent and that said Letters Patent is hereby corrected as shown below:

In column 1, line 6, "for the a" should be changed to --for the--.

In column 5, line 27, "PEBD" should be changed to --LDPE--.

Signed and Sealed this

Eleventh Day of May, 1999

Attest:

Q. TODD DICKINSON

*Attesting Officer*     *Acting Commissioner of Patents and Trademarks*